(12) United States Patent
Thran et al.

(10) Patent No.: US 11,232,881 B2
(45) Date of Patent: Jan. 25, 2022

(54) ANTI-SCATTER GRID ASSEMBLY FOR DETECTOR ARRANGEMENT

(71) Applicant: KONINKLIJKE PHILIPS N.V., Eindhoven (NL)

(72) Inventors: Axel Thran, Hamburg (DE); Heiner Daerr, Hamburg (DE); Ewald Roessl, Hamburg (DE); Gereon Vogtmeier, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 8 days.

(21) Appl. No.: 16/463,150

(22) PCT Filed: Nov. 22, 2017

(86) PCT No.: PCT/EP2017/080096
§ 371 (c)(1),
(2) Date: May 22, 2019

(87) PCT Pub. No.: WO2018/095983
PCT Pub. Date: May 31, 2018

(65) Prior Publication Data
US 2019/0378631 A1 Dec. 12, 2019

(30) Foreign Application Priority Data

Nov. 24, 2016 (EP) .................................... 16200414

(51) Int. Cl.
*G01T 1/16* (2006.01)
*G21K 1/02* (2006.01)

(52) U.S. Cl.
CPC ................ *G21K 1/025* (2013.01); *G01T 1/16* (2013.01)

(58) Field of Classification Search
CPC .................................. G01T 1/16; G21K 1/025
See application file for complete search history.

(56) References Cited

U.S. PATENT DOCUMENTS

| | | | |
|---|---|---|---|
| 5,436,958 A | 7/1995 | Taylor | |
| 2006/0055087 A1* | 3/2006 | Freund | G21K 1/025 264/401 |
| 2007/0064878 A1* | 3/2007 | Heismann | G21K 1/025 378/154 |

(Continued)

FOREIGN PATENT DOCUMENTS

| | | | |
|---|---|---|---|
| CN | 204318778 U | 5/2015 | |
| DE | 102005010660 A1 * | 9/2006 | G21K 1/025 |

(Continued)

OTHER PUBLICATIONS

PCT International Search Report, International application No. PCT/EP2017/080096, dated Mar. 2, 2018.

*Primary Examiner* — Mark R Gaworecki
(74) *Attorney, Agent, or Firm* — Larry Liberchuk

(57) ABSTRACT

The present invention relates to an anti-scatter grid (ASG) assembly comprising a first and a second grid, wherein the second grid is arranged on top of the first grid and comprises a lateral shift. The lamella thickness of the first grid is smaller than the lamella thickness of the second grid. The present invention further relates to a detector arrangement comprising a pixel detector and an ASG assembly arranged on top of the pixel detector.

20 Claims, 9 Drawing Sheets

(56) References Cited

U.S. PATENT DOCUMENTS

| | | | |
|---|---|---|---|
| 2008/0118033 A1* | 5/2008 | Klausz | G21K 1/025 378/154 |
| 2009/0225938 A1* | 9/2009 | Zeitler | G01T 1/2985 378/51 |
| 2013/0168567 A1 | 7/2013 | Wartski | |
| 2014/0177781 A1 | 6/2014 | Singh | |
| 2017/0265833 A1* | 9/2017 | Danielsson | A61B 6/032 |
| 2018/0052240 A1 | 2/2018 | Tanabe | |
| 2018/0329086 A1 | 11/2018 | Roessl | |

FOREIGN PATENT DOCUMENTS

| | | | |
|---|---|---|---|
| DE | 102008025201 A1 * | 12/2009 | A61B 6/5282 |
| DE | 102008025201 A1 | 12/2009 | |
| JP | 02297099 A | 12/1990 | |
| JP | 2007010559 A | 1/2007 | |

* cited by examiner

ANTI-SCATTER GRID ASSEMBLY FOR DETECTOR ARRANGEMENT

FIELD OF THE INVENTION

The present invention relates to an anti-scatter grid assembly and a detector arrangement. In particular, the invention relates to stacked anti-scatter grids, in particular for pixel detectors, such as photon counting detectors, to provide a higher spectral performance.

BACKGROUND OF THE INVENTION

Current two-dimensional anti-scatter grids (ASGs) for CT consist of a grid of lamellae having all the same height. Each opening in the ASG is centered above one detector pixel. The lamellas have typically a thickness of 100 μm and the pixel size is about 1 mm in each dimension. The height of the ASG is typically some cm. The high aspect ratio realized this way leads to a very small acceptance angle for x-rays penetrating the AGS towards the detector. Therefore, only primary radiation having a direction parallel to the lamellas can pass the ASG while radiation scattered in the scanned object largely hits the ASG from other directions and is effectively absorbed before reaching the detector.

For photon counting spectral CT there are some new aspects regarding the ASG: Since the maximum count rate per pixel limits the maximum x-ray flux it is advantageous to operate the detector with a considerably smaller pixel size than for conventional CT is favorable. Moreover, besides absorbing scattered radiation the ASG has an additional benefit for the spectral performance: Charge clouds generated by photons entering the detector area near the pixel borders yield pulses in both adjacent pixels, mimicking two photons with lower energies rather than one photon with the original energy. Suppressing this charge sharing effect by covering the pixel borders with an ASG increases the spectral performance of the detector considerably.

A fabrication of an ASG scaled to the smaller pixel size is very difficult. Therefore, the above-mentioned configuration is difficult to realize for pixelated photon counting detectors (also called "pixel detectors" hereinafter).

U.S. Pat. No. 5,436,958 A discloses a collimator. The collimator comprises a stack of ASGs and an adjustment mechanism for moving selected ASGs with respect to other ASGs to align their openings such that a plurality of geometrically different hole patterns may be formed through the collimator.

SUMMARY OF THE INVENTION

It is an object of the present invention to provide an improved anti-scatter grid assembly and detector arrangement providing a higher spectral performance, in particular improved energy resolution and more efficient absorption of scattered radiation, in particular x-rays, as well as higher dose efficiency by lowering the absorption of primary radiation.

In a first aspect of the present invention an anti-scatter grid assembly for a pixel detector is presented that comprises:
a first grid comprising first lamellas and first holes forming the first grid and
a second grid comprising second lamellas and second holes forming the second grid,
wherein the second grid is arranged on top of the first grid with a lateral shift in at least one lateral direction, and
wherein the thickness of the first lamellas is smaller than the thickness of the second lamellas.

In a further aspect of the present invention a detector arrangement is presented comprising
a pixel detector and
an anti-scatter grid assembly according to the first aspect of the invention arranged on top of the pixel detector with the first grid facing the pixel detector.

Preferred embodiments of the invention are defined in the dependent claims.

The present invention is based on the idea to combine several ASGs, in particular each having a pitch larger than the detector pixel pitch, on top of each other with a lateral shift. Thus, the openings of each ASG are also arranged on top of each other with a lateral shift and create effective holes extending through the stack of ASGs. The pitch of the effective holes is smaller than the pitch of the openings of each ASG. The cross-sectional area of each effective hole depends on the thickness of the lamellas of the ASGs. The geometric efficiency depends on the cross-sectional area of the effective holes in relation to the pitch of the holes. Through configuring the lower ASG with a smaller thickness than the upper ASG, the dose efficiency is improved.

The lateral shift of the second grid with respect to the first grid shall be understood generally as an arrangement of the grids where the second grid is arranged incongruently on top of the first grid. Thus, the second lamellas of the second grid are substantially not aligned corresponding to the first lamellas of the first grid. In particular most or all, i.e. at least 50%, of the second lamellas of the second grid are substantially not aligned corresponding to the first lamellas of the first grid. For instance, if a pitch of one grid is an integer multiple of a pitch of the other grid, the lateral shift is constant at all locations of the second grid. In another embodiment, if the pitch of one grid is not an integer multiple of the pitch of the other grid, the lateral shift is not constant at all locations of the second grid.

Further, the absorption ability of an ASG depends on the thickness of the lamellas. The majority of the scattered radiation hits the upper ASG (i.e. the second grid) and must be absorbed by the upper ASG. Thus, configuring the lower ASG (i.e. the first grid) with a smaller thickness as the upper ASG leaves the absorption ability nearly similar. Hence, this stack of ASGs leads to an improved absorption of scattered radiation.

Further, the generated effective holes can comprise a small size and a small pitch while the size and the pitch of the holes of each ASG is bigger, in particular twice or more, as the size and the pitch of the effective holes. While a single ASG is limited by manufacturing technology to a minimum pitch of the holes and to a maximum size of the holes according to the pitch, the ASG assembly comprising stacked ASGs provides a possibility to get to smaller pitches and bigger sizes according to the pitches through the effective holes.

Further, the fabrication of the individual grids of this stack would be much easier than for a fine ASG having a pitch equal to the small pitch of the pixels of the pixel detector. In particular, the pixel detector is a photon counting detector.

The improved detector arrangement can thus advantageously be used for spectral CTs providing higher spectral performance.

According to an embodiment, the thickness of the first lamellas is in the range of 20% to 80%, in particular 40% to 60%, of the thickness of the second lamellas. The selection of an appropriate ratio between the thicknesses of the first lamellas and the second lamellas depends on the mechanical stability of each grid, the limits provided by the manufacturing technology and the desired cross-sectional area of the effective holes and width of the pixel border to be covered depending on the aimed spectral performance improvement. Therefore, the above-mentioned ranges provide an appropriate selection.

According to a further embodiment, the thickness of the first lamellas of the first grid and/or the thickness of the second lamellas of the second grid is constant. The fabrication of grids with a constant thickness of its lamellas is generally much easier than the fabrication of grids with an inconstant thickness of its lamellas.

According to a further embodiment, the thickness of the first lamellas of the first grid and/or the thickness of the second lamellas of the second grid comprises a gradient changing the thickness from a bottom end to a top end of the grid. It is advantageous to realize larger lamella thicknesses near the detector and lower thicknesses at the opposite side. The reason is the following: The ASGs are usually focus-centered, i.e., all lamellas point towards the x-ray focal spot. Consequently, the holes in ASGs with constant lamella thicknesses are conus-shaped, i.e., getting wider towards the detector end of the ASG. This leads to a sensitivity of the setup to motions of the x-ray focal spot, since the shadow of the ASG on the detector moves with the focal spot. To get rid of this sensitivity, lamellas of conventional ASGs are often T-shaped, where the vertical line of the T represents the lamella itself and the horizontal line is a widening of the lamella at the detector end of the ASG. The above described variation of the lamella thickness is an alternative to the T-shaped form of the lamellas. The advantage is to achieve a higher absorption power for scattered radiation at the same geometrical efficiency.

According to a further embodiment, a first height ($h_1$) of the first grid (2) is smaller than a second height ($h_2$) of the second grid (3), in particular the height of the first grid is less than 20%, in particular less than 10%, of the height of the second grid. If the second lamellas of the second grid are higher and thicker than the first lamellas of the first grid, the second grid mostly absorbs the scattered radiation. In this case the absorbing ability for scattered radiation of the first grid is less relevant, however, it is designed to absorb primary radiation, which would otherwise be detected at pixel borders and therefore deteriorated the spectral performance of the detector.

According to a further embodiment, the second grid is arranged movable in at least one lateral direction relative to the first grid providing a variable lateral shift, in particular the second grid is movable into a first position at a lateral shift in the range of 0% to 10%, preferably 0%, of the pitch of the first holes and/or the second holes, and into a second position at a lateral shift in the range of 40% to 60%, preferably 50%, of the pitch of the first holes and/or the second holes. Therefore, the lateral shift can situationally be adjusted. In particular, the first position can be used for conventional CT imaging utilizing the higher dose efficiency, when the second grid shadows the first grid, while the second position can be used for spectral imaging, especially material separation, utilizing the better spectral performance.

According to a further embodiment, the first holes are equidistantly spaced apart in at least one lateral direction and comprise a first pitch and the second holes are equidistantly spaced apart in at least one lateral direction and comprise a second pitch, and wherein the first pitch or the second pitch is an integer multiple of the pitch of the other grid, in particular the first pitch and the second pitch are equal. This provides a pattern of the effective holes and allows covering the regularly arranged pixel borders. Generally, the pitch of a grid is equal to the distance of the centers of adjacent holes of the grid in each lateral direction. The value of the pitch can be different in each lateral direction.

According to a further embodiment, the lateral shift is half as large as the first pitch and/or the second pitch. Therefore, the ASG assembly provides a symmetric form with symmetric spaced apart effective holes. This leads to a maximized resolution of the ASG assembly. In particular, the stack of ASGs should have pitches equal to the detector pixel grid in each dimension, at least the ASGs should have pitches, which are integer multiples of the detector pixel pitches.

According to a further embodiment, a height of the second grid is larger than the first pitch and/or the second pitch, in particular the height of the second grid is in the range of 500% to 5000%, in particular 1500% to 2500%, of the first pitch and/or the second pitch. The absorption efficiency for scattered radiation depends on the ratio between the size of the pitch of the second or the first grid and the height of the second grid or of the first grid, respectively. The bigger the height of the second grid is the higher is the absorption efficiency for scattered radiation, while the task for the first grid is to absorb also primary radiation.

According to a further embodiment, the first grid and/or the second grid comprise contoured edges at a first side facing the other grid, wherein the contoured edges are configured for positioning of the other grid. The contoured edges serve as a guide while positioning the ASGs. Thus, a precise desired shift between both ASGs is achieved.

According to a further embodiment, the first grid and/or the second grid comprise notches in a first side facing the other grid, wherein the notches are configured for inserting the other grid. Thus, a precise desired shift between both ASGs is achieved because the notches provide an exact positioning of the ASGs. For instance, when both ASGs have the same height and when notches with a depth equal to half the height of the ASG are realized as well in the first as in the second ASG, in principle an overlap can be achieved being as large as the total height of each ASG. Then the resulting interlocked ASG assembly will resemble an ASG with half pitch. However, the deeper the notches the more the stability of the individual ASGs is lowered making the process of interlocking the two ASGs more difficult. This may limit the achievable overlap of both ASGs.

According to a further embodiment, the grid assembly comprises more than one first grid and/or more than one second grid, wherein the first grids and the second grids are alternately arranged on top of each other. This provides nearly the similar effects as a stack of only two ASGs. Hereby, the first grids have to absorb an essential part of the scattered radiation less than 50%. Preferably, the difference between the thicknesses of the first grids and the second grids should not be large, particularly less than 20%. The first grids and/or the second grids may comprise different heights. Thus, tilted free paths through the stack of ASGs can be avoided. Further, the absorption power of this structure is very similar to a regular ASG. Instead of building stacks of two ASGs with double pitch there are many other realizations generally possible, where fractions of the lamellas are absent. In the laser sintering process the generation of such holes does not pose a problem and lead to an accelerated production.

According to a further embodiment, the pixels of the pixel detector are equidistantly spaced apart in at least one lateral direction and comprise a pixel pitch, and wherein the first pitch of the first grid and/or the second pitch of the second grid are multiple integers of the pixel pitch of the pixels of the pixel detector. Thus, the first and/or the second grid is adjusted to the symmetry of the pixel detector. This results in a symmetric covering of the pixels and an improved resolution.

According to a further embodiment, the first holes are configured to cover sets of pixels of the pixel detector, in particular sets of 2×2 pixels, wherein the first lamellas cover the borders of each set of pixels of the pixel detector. In a configuration with a single ASG covering 2×2 pixels, however, only about 50% of the pixel borders would be covered by one ASG and consequently the spectral performance would improve only to a limited extent compared to the case without any ASG, where the whole detector is illuminated with x-rays. The effective holes of a stacked ASG can be arranged to cover smaller sets of pixels as the holes of each single ASG. Thus, the spectral performance is improved.

Instead of the 2:1 relation between the pitches of the ASG and the detector pixels assumed so far the described approaches may also be applied to other relations. For example, the pitch of the ASG may be three times larger than the detector pixel pitch and a stack of three ASGs may be realized to achieve an effective ASG covering all pixel edges. Also, the pitches of the AGSs and the detector pixel may be different in row and column direction of the detector. Further, the ASGs in the stack may be shifted only in one direction, either row direction or column direction of the detector. This would enable a more stable connection between both ASGs.

According to a further embodiment, the anti-scatter grid assembly further comprises:
  a third grid comprising third lamellas and third holes forming the third grid, wherein the third holes are equidistantly spaced apart and comprise a third pitch; and
  a fourth grid comprising fourth lamellas and fourth holes forming the fourth grid, wherein the fourth holes are equidistantly spaced apart and comprise a fourth pitch, wherein the third grid is arranged on the bottom of the first grid, wherein the fourth grid is arranged on the top of the second grid. The third pitch and the fourth pitch are less than the first pitch of the first grid and/or the second pitch of the second grid, in particular half as large as the first pitch of the first grid and/or the second pitch of the second grid.

The approach to build stacks of ASGs may also be used to improve AGS with respect to their weight and ease of manufacturing. In the above-mentioned stack the AGSs at the bottom and the top could have a pitch equal to the detector pixel pitch, while the AGSs between them could have the double pitch. Therefore, only about half of the material is required, reducing the amount of material and time for the manufacturing process, in particular laser sintering, as well as the weight of the mounted structure. By realizing small heights of the individual ASGs in the stack and an irregular stacking sequence, tilted free paths through the stack of ASGs can be avoided. Therefore, the absorption power of this structure is very similar to a regular ASG.

According to a further embodiment, the first grid and/or the second grid are made of one of the materials of tungsten and molybdenum. These materials generally used for creating ASGs but also other materials are possible. Both materials are suitable for manufacturing processes like laser sintering or micro-fabrication processes like etching. Based on the x-ray absorption properties, the minimal height of a grid is about 0.2 mm, when the grid is made from tungsten, and about 1.3 mm, when made from molybdenum. Therefore, the first grid may be made of tungsten and the second grid may be made of molybdenum. For instance, the two ASGs may be fabricated separately and either be attached to each other by gluing or soldering or be positioned on top of each other without a fastening.

BRIEF DESCRIPTION OF THE DRAWINGS

These and other aspects of the invention will be apparent from and elucidated with reference to the embodiment(s) described hereinafter. In the following drawings

DETAILED DESCRIPTION OF THE INVENTION

Figure 1:
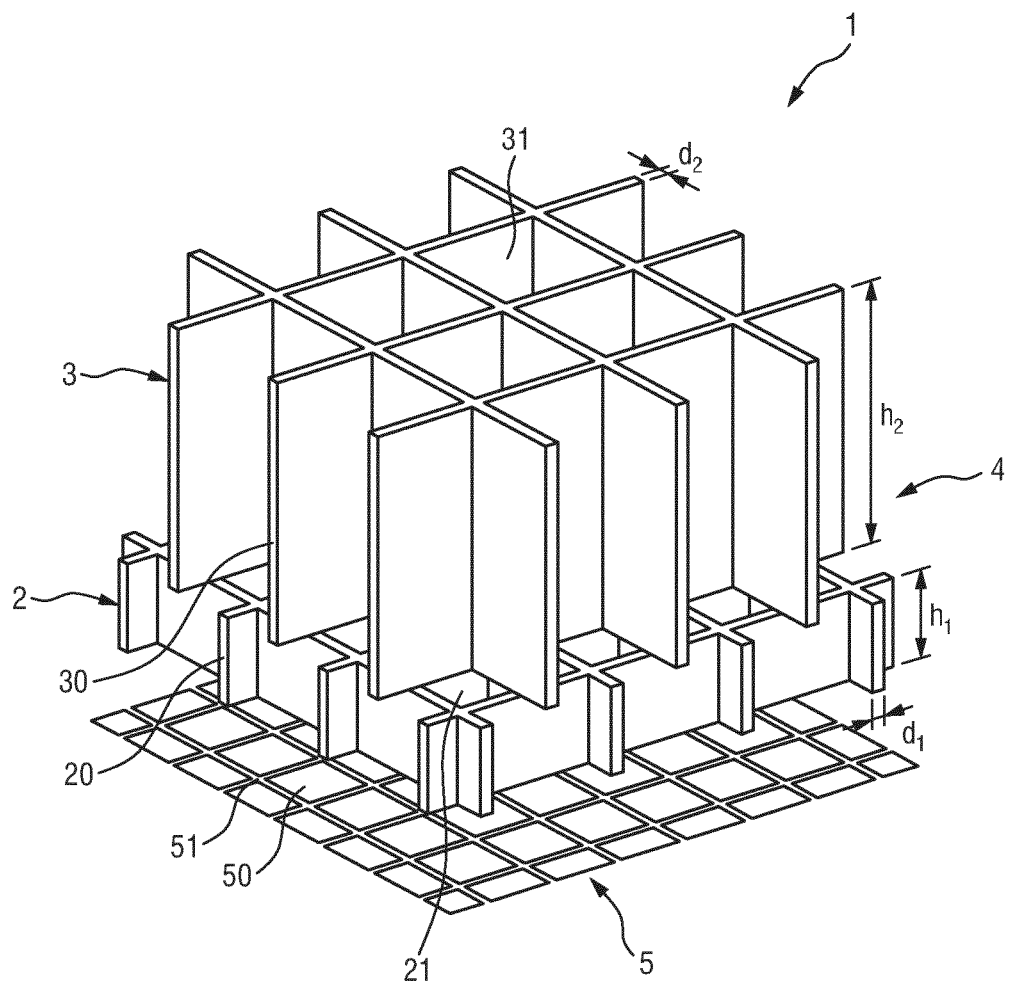
FIG. 1 shows a perspective view of a first embodiment of a detector arrangement.

FIG. 1 shows a first embodiment of a detector arrangement 1 according to the present invention. This detector arrangement 1 may be particularly used in a medical CT or in a baggage scanning unit. The detector arrangement 1 comprises an anti-scatter grid assembly 4 and a pixel detector 5. The anti-scatter grid assembly 4 comprises a first grid 2 and a second grid 3.

The first grid 2 (see also FIG. 2) further comprises first lamellas 20 and first holes 21 forming the first grid 2. The first grid 2 further comprises a first side 22 facing the second grid 3 and a second side 23 being arranged diametrically opposed to the first side 22. The first grid 2 has a first height $h_1$ being equal to the distance between the first side 22 and the second side 23. The first lamellas 20 have a first thickness $d_1$. The second grid 3 (see also FIG. 3) comprises second lamellas 30 and second holes 31 forming the second grid 3. The second grid 3 further comprises a first side 32 facing the first grid 2 and a second side 33 being arranged diametrically opposed to the first side 32. The second grid has a second height $h_2$ being equal to the distance between the first side 32 and the second side 33. The second lamellas 30 have a second thickness $d_2$.

The first thickness $d_1$ is smaller than the second thickness $d_2$. In particular the ratio between the first thickness $d_1$ and the second thickness $d_2$ is in the range of 20% to 80%. In this embodiment presented in FIG. 1 the ratio is around 50%. The first height $h_1$ is also smaller than the second height $h_2$. In particular the ratio between the first height $h_1$ and the second height $h_2$ is in the range of 500% to 5000%. In the described embodiment (i.e. in FIG. 1) the ratio is about 300%. The ratio is chosen such that all components of the detector arrangement 1 are clearly made visible.

The first holes 21 of the first grid 2 comprise a first pitch $p_1$ corresponding to the distance between the centers of the adjacent holes 21 in each lateral direction. The second grid 3 comprises a second pitch $p_2$ corresponding to the distance between the centers of the adjacent holes 31 in each lateral direction. The first pitch $p_1$ and the second pitch $p_2$ are equal. In general, the first pitch $p_1$ and the second pitch $p_2$ may not be equal, e. g. the first pitch $p_1$ or the second pitch $p_2$ may be an integer multiple of the other pitch. The second grid 3 is arranged on top of the first grid 2 with a lateral shift 40 in two lateral directions. The lateral shift 40 in each lateral direction is equal to half of the first pitch $p_1$ and the second pitch $p_2$. Generally, the pitches $p_1$, $p_2$ can be different in each lateral direction.

The anti-scatter grid assembly 4 is arranged on top of the pixel detector 5 with the first grid 2 facing the pixel detector 5. The pixel detector 5 (see also FIG. 5) comprises pixels 50 and borders 51 surrounding each pixel 50 and separating each pixel 50 from the nearest adjacent pixel 50. The pixels 50 of the pixel detector 5 comprise a pixel pitch $p_3$ (illustrated in FIG. 5). The pixel pitch $p_3$ is equal to half of the first pitch $p_1$ and the second pitch $p_2$. Thus, the pixel pitch $p_3$ is equal to the lateral shift 40. The first grid 2 is configured to cover always sets of 2×2 pixels 50 of the pixel detector 5. In particular, the first grid 2 and the second grid 3 are configured to cover the borders 51 of the pixels 50 of the pixel detector 5 such that non-scattered radiation does not hit the borders 51 of the pixels 50 but always hit the pixels 50.

For instance, in an exemplary implementation with an assumed pixel pitch $p_3$ of 0.5 mm and two stacked ASGs 2,3 each comprising a lamella thickness of 0.1 mm the geometric detector efficiency will be rather small. The pixel area not covered by the ASG assembly 4 is 0.4×0.4 mm², i.e., only 0.16 mm²/0.25 mm²=64% of the pixel area. The effective pixel area can be increased to some extent by lowering the lamella thickness of one or both ASGs 2,3, in particular the first ASG 2. The effective pixel area is equal to the size of the effective holes 41 of the grid assembly described in FIG. 4.

In a further exemplary implementation the first lamellas 20 comprise a thickness $d_1$ of about 20 to 80 µm, in particular 50 µm, and the second lamellas 30 comprise a thickness $d_2$ of about 80 to 150 µm, in particular 100 µm.

The two ASGs 2,3 may have different lamella thicknesses and the first grid 2 may have a much smaller height $h_1$ than the second grid 3, since its purpose is to absorb x-ray photons directed towards detector pixel edges rather than absorbing photons scattered in the object. The minimal height for this purpose is about 0.2 mm, when the first ASG 2 is made from tungsten and about 1.3 mm, when made from molybdenum. One can make use of these different specifications by using different processes to generate both ASGs 2,3. For example, the first ASG 2 may be generated by a micro-fabrication process like etching, which allows producing a lamella thickness of e.g. 40 µm, but is not suited for high aspect ratios, i.e., large ASG heights. The second ASG 3 may be produced via laser sintering, which allows a high aspect ratio but the minimal achievable lamella thickness is about 100 µm. The combination of a first ASG with 40 µm lamellas and a second ASG with even 80 µm lamella thickness in a stacked ASG assembly 4 would have much better geometrical efficiency than a regular ASG assembly each grid with 0.5 mm pitch and 80 µm lamellas. The geometric efficiency of the regular ASG assembly would be $$r_1 = \left( \frac{0.5 \text{ mm} - \frac{1}{2}(0.08 \text{ mm} + 0.08 \text{ mm})}{0.5 \text{ mm}} \right)^2 = 0.7056,$$

while the geometric efficiency of the ASG assembly 4 would be $$r_2 = \left( \frac{0.5 \text{ mm} - \frac{1}{2}(0.08 \text{ mm} + 0.04 \text{ mm})}{0.5 \text{ mm}} \right)^2 = 0.7744,$$

i.e., about 10% higher than $r_1$.

In a further exemplary implementation the height $h_1$ of the first grid 2 is about 0.3 mm and grid 2 is made from tungsten. Then, more than 90% of 100 kV photons would be absorbed or scattered within this grid, so it would considerably reduce the x-ray flux onto the pixel borders. The height $h_2$ of the second grid 3 is several cm.

Figure 2:
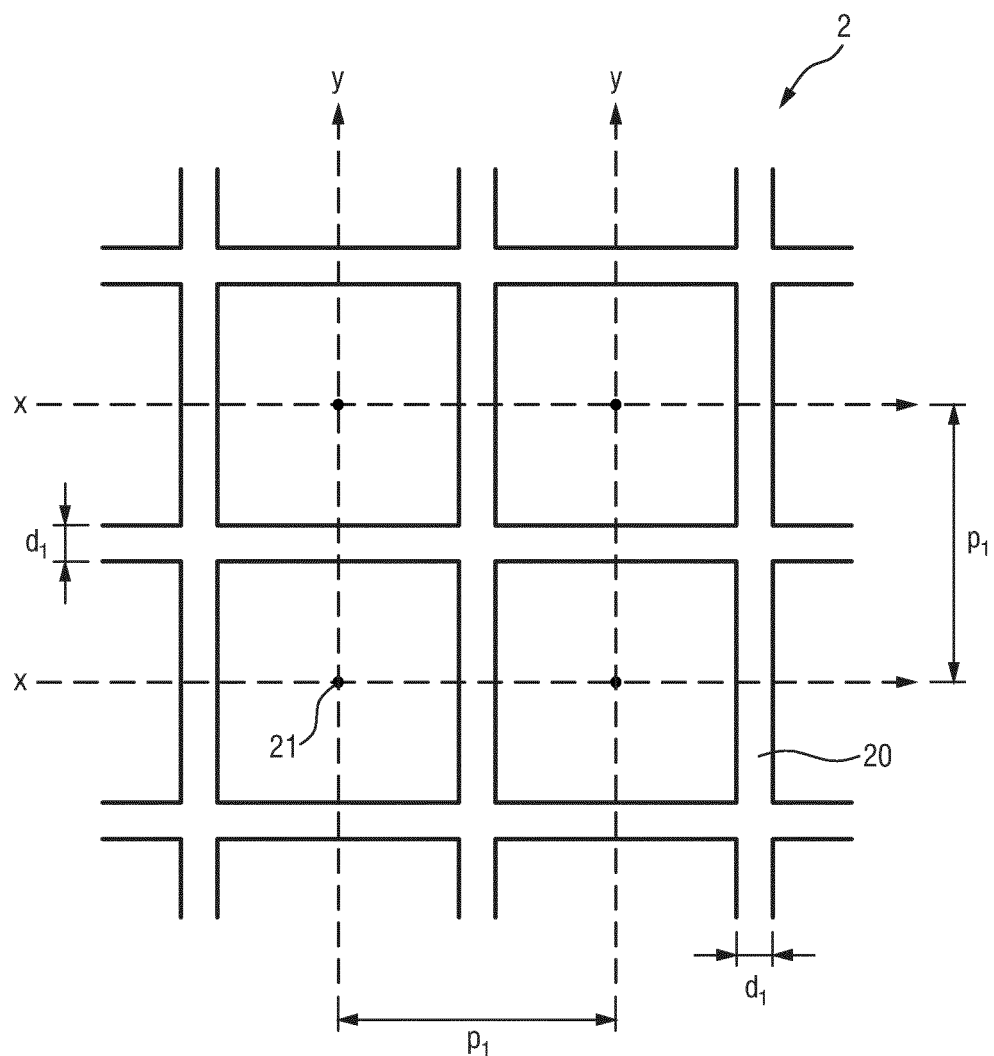
FIG. 2 shows a top view of a first embodiment of a first grid.

FIG. 2 shows a first embodiment of the first grid 2. The first grid 2 comprises first lamellas 20, first holes 21, and a first height $h_1$ that is not illustrated in FIG. 2. The lamellas 20 comprise a first thickness $d_1$. The first holes 21 comprise a first pitch $p_1$ corresponding to the distance between the centers of the adjacent holes in each lateral direction (x, y). The first holes 21 comprise a tetragonal form. In general, the first holes 21 may comprise many other realizations of its form, e. g. circular, oval, triangular, polygonal or an arbitrary freeform surface. In particular, the pitch $p_1$ may be different in each lateral direction.

Figure 3:
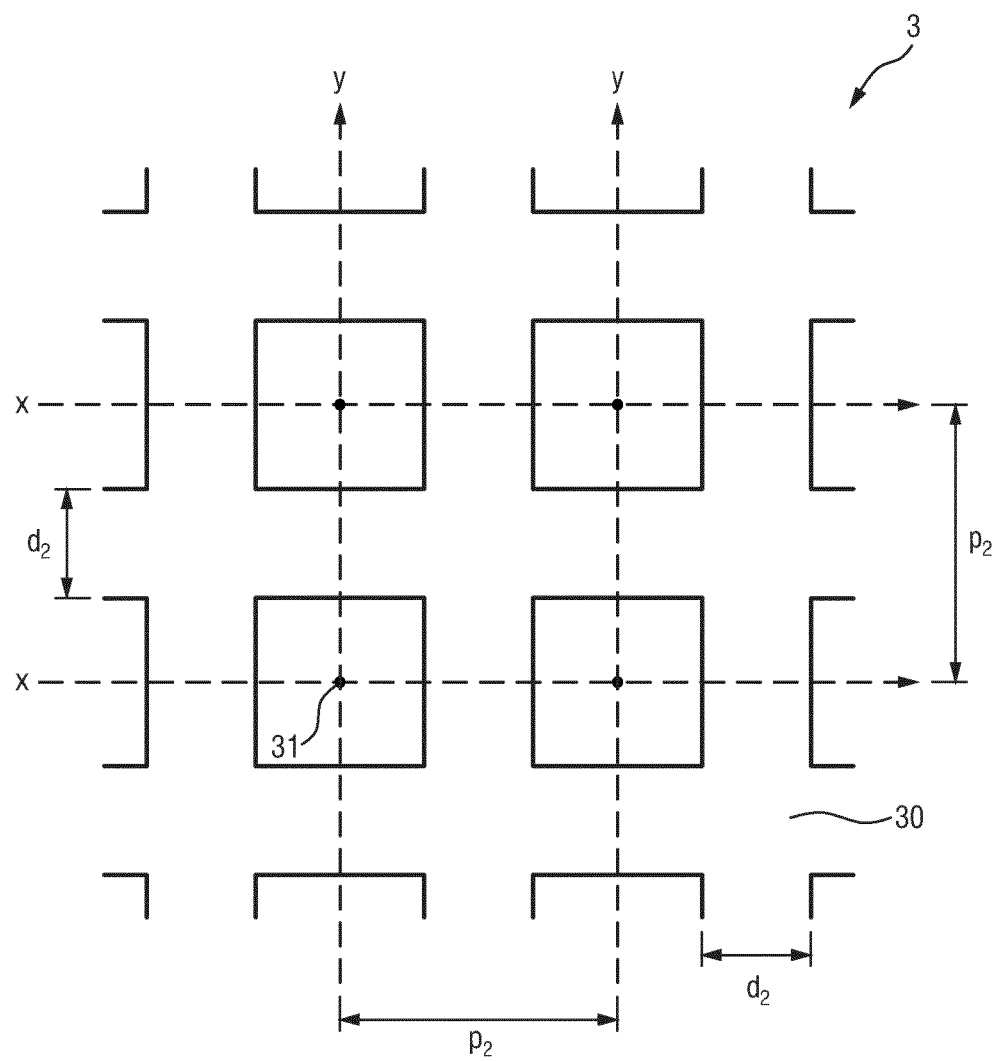
FIG. 3 shows a top view of a first embodiment of a second grid.

FIG. 3 shows a first embodiment of the second grid 3. The second grid 3 comprises second lamellas 30, second holes 31 and a second height $h_2$ that is not illustrated in FIG. 3. The second lamellas 30 comprise a second thickness $d_2$. The second holes 31 comprise a second pitch $p_2$ corresponding to the distance between the centers of the adjacent holes in each lateral direction (x, y). The second holes 31 comprise a tetragonal form. In general, the second holes 31 can comprise many other realizations of its form, e. g. circular, oval, triangular, polygonal or an arbitrary freeform surface. In particular, the pitch $p_1$ may be different in each lateral direction.

Figure 4:
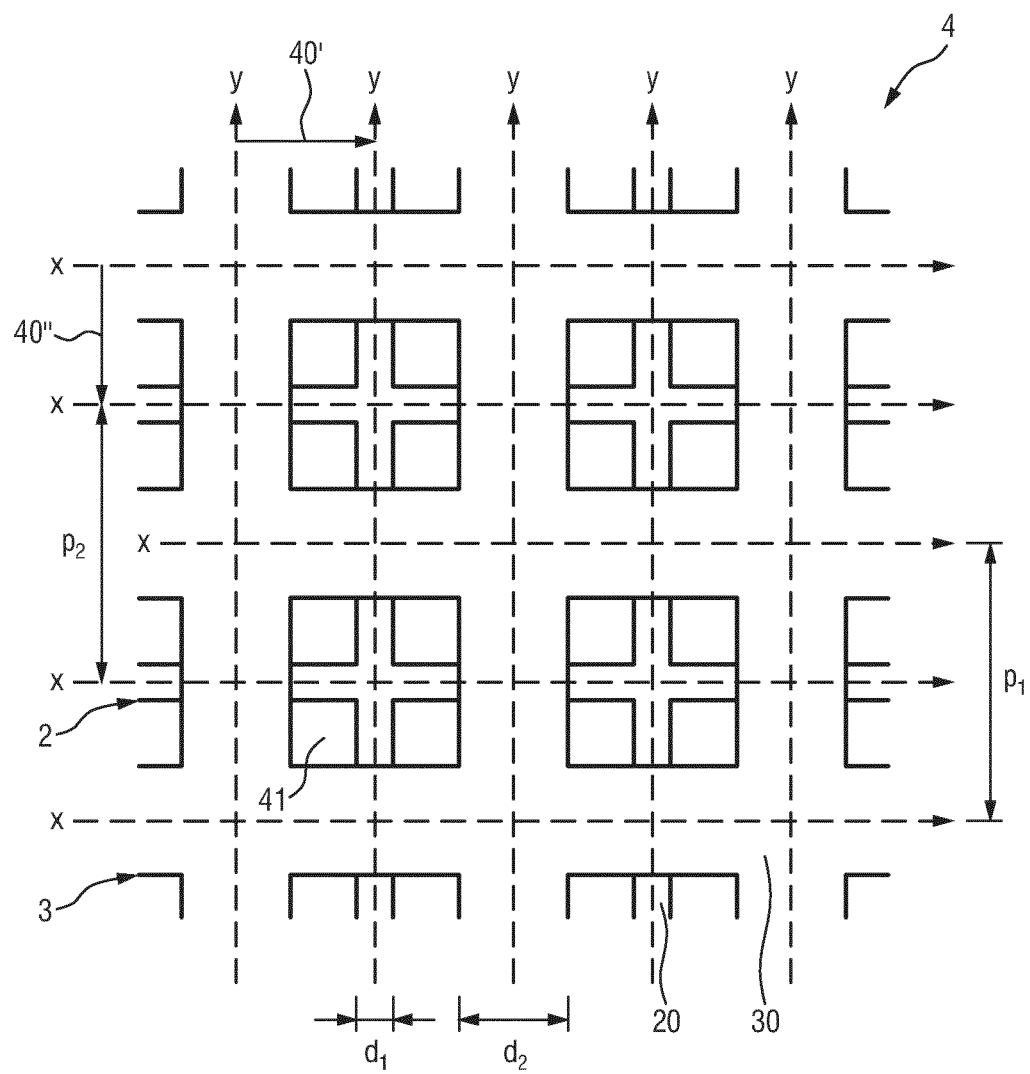
FIG. 4 shows a top view of a first embodiment of an anti-scatter grid assembly.

FIG. 4 shows an embodiment of an anti-scatter grid assembly 4. The anti-scatter grid assembly 4 comprises a first grid 2 according to the embodiment illustrated in FIG. 2 and a second grid 3 according to the embodiment illustrated in FIG. 3. The first pitch $p_1$ and the second pitch $p_2$ are equal. The first grid 2 and the second grid 3 comprise a lateral shift (40', 40") in each lateral direction (x, y). The lateral shift (40', 40") in each lateral direction (x, y) is equal to half of the first pitch $p_1$ and the second pitch $p_2$. The first thickness $d_1$ of the first lamellas 20 of the first grid 2 is smaller than the second thickness $d_2$ of the second lamellas 30 of the second grid 3. The anti-scatter grid assembly 4 further comprises effective holes 41 formed by lateral shifting (40', 40") the first grid 2 and the second grid 3. The size of the effective holes 41 also depends on the first thickness $d_1$ and the second thickness $d_2$. In this embodiment the size and the form of all effective holes 41 are equal. In general, the size and form of each effective hole 41 may be different.

Figure 5:
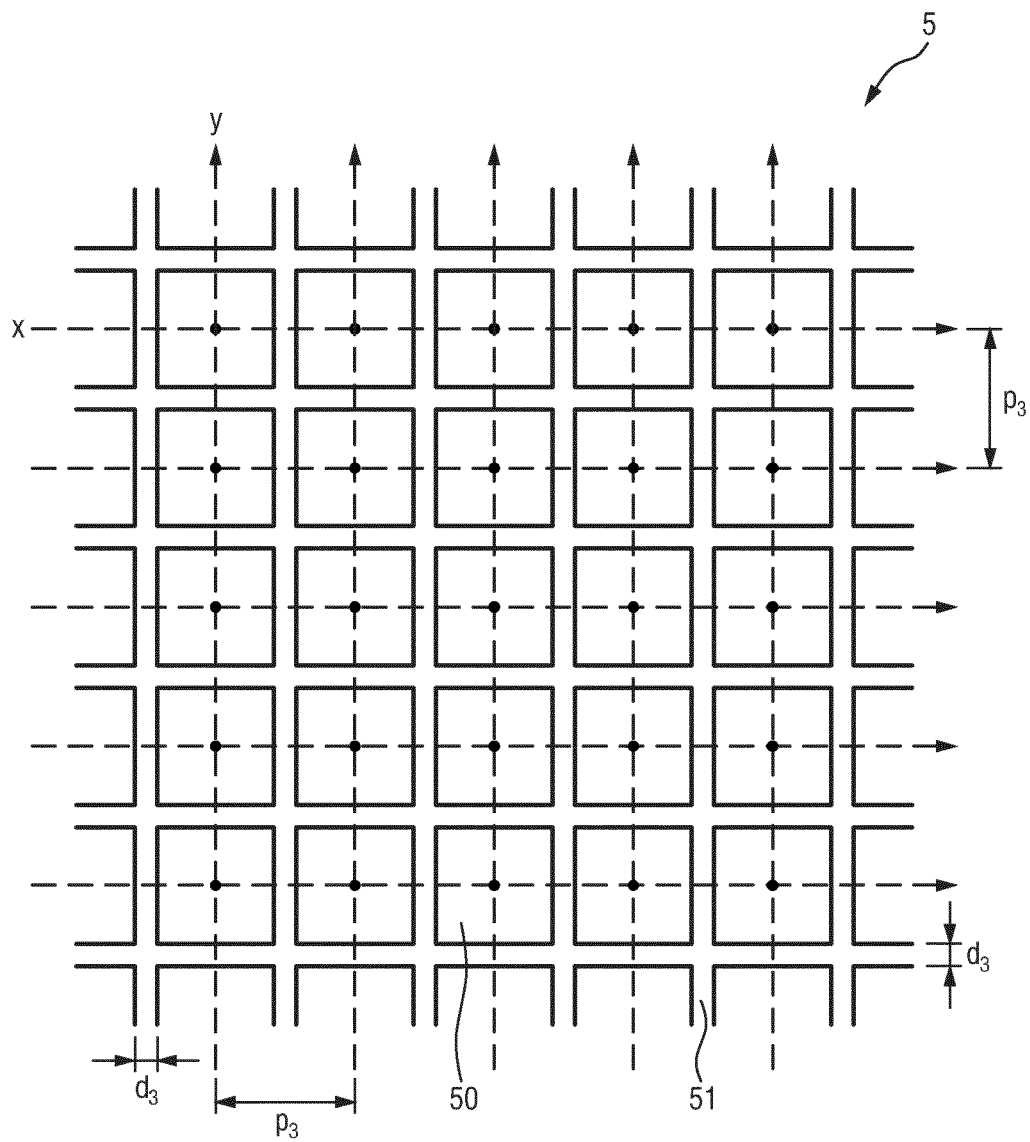
FIG. 5 shows a top view of a first embodiment of a pixel detector.

FIG. 5 shows a first embodiment of a pixel detector 5. The pixel detector 5 comprises pixels 50 and borders 51 of the pixels 50. The borders 51 comprise a third thickness $d_3$. The pixels 50 comprise a pixel pitch $p_3$ corresponding to the distance between the centers of the adjacent pixels 50 in each lateral direction (x, y).

For instance, the detector may be of an indirect conversion type, i.e., consisting of a scintillator and photodetectors measuring the scintillating light generated when x-rays are absorbed. In particular the detector may be of a direct conversion type consisting of a semiconducting sensor material like Cadmium-Zink Telluride (CZT) and pixel electronics detecting electrical pulses generated by individual x-ray photons. In the latter case the sensor material extends over many pixels and the pixel shapes are just defined by the geometry of the electrodes collecting the electrical charges for each pixel. The pixel borders are not defined as sharply as shown in FIG. 5 but can be seen more as a region, where the electrical charges generated by individual x-ray photons are split among the two (or even up to four) adjacent pixels. These regions have an extension in the ranges of several 10 µm depending among others on the thickness of the detector material. The charge sharing is an unwanted effect. Therefore, the ambition is to absorb x-rays aiming towards the pixel borders.

Figure 6:
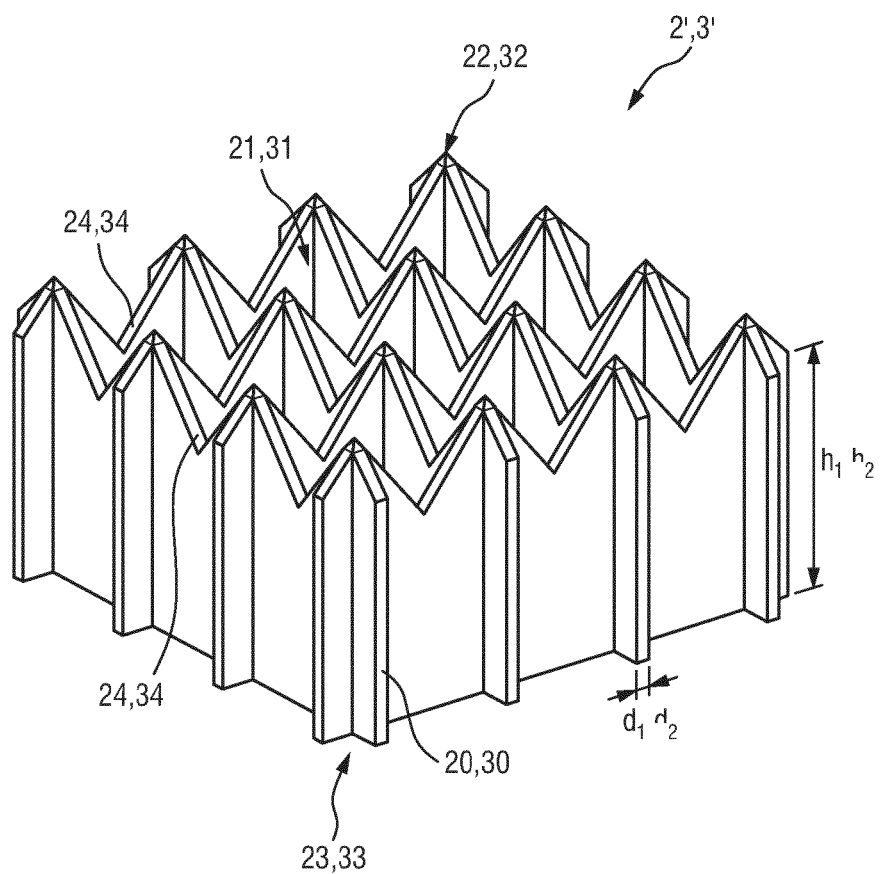
FIG. 6 shows a perspective view of a second embodiment of the first and second grid.

FIG. 6 shows a second embodiment of either the first grid 2' or the second grid 3'. The grid 2', 3' comprises lamellas 20, 30, holes 21, 31 that are not illustrated in FIG. 6 and a height $h_1$, $h_2$. The lamellas 20, 30 comprise a thickness $d_1$, $d_2$. The grid 2', 3' further comprises a first side 22, 32 and a second side 23, 33. The lamellas 20, 30 comprise contoured edges 24, 34 at the first side 22, 32 of the grid 2', 3'. The contoured edges 24, 34 of the grid 2', 3' are configured for positioning the other grid. Even both grids 2', 3' may comprise contoured edges 24, 34.

Figure 7:
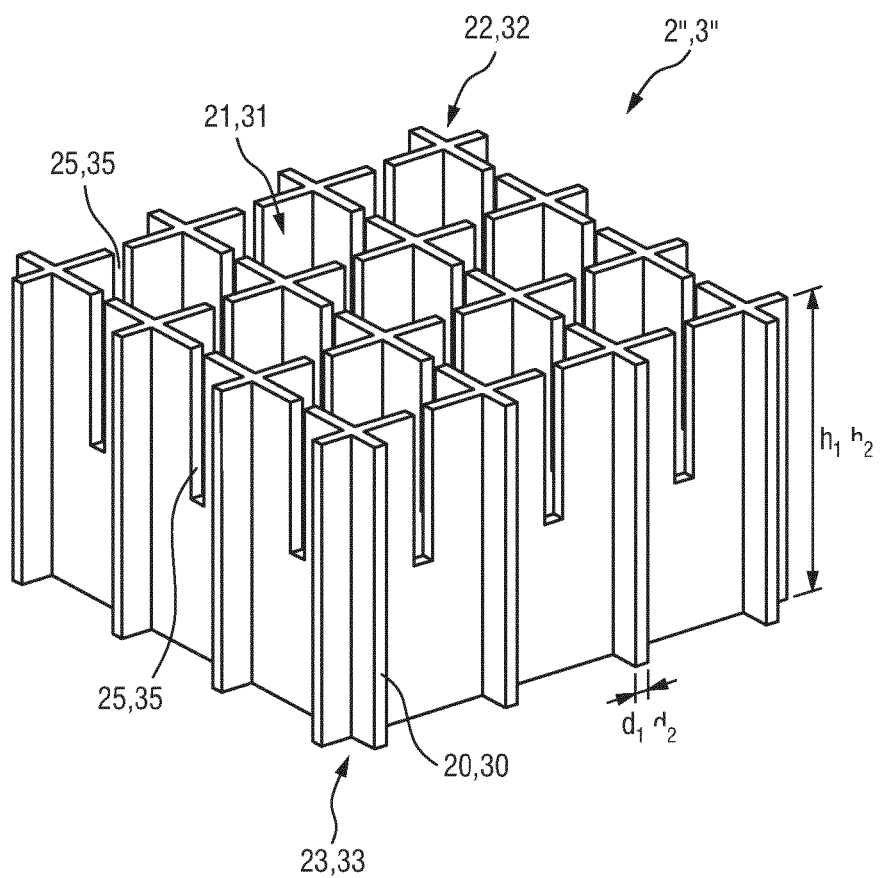
FIG. 7 shows a perspective view of a third embodiment of the first and the second grid.

FIG. 7 shows a third embodiment of the first grid 2" and the second grid 3". The grid 2", 3" comprises lamellas 20, 30, holes 21, 31 and a height $h_1$, $h_2$. The lamellas 20, 30 comprise a thickness $d_1$, $d_2$. The grid 2", 3" further comprises a first side 22, 32 and a second side 23, 33. The lamellas 20, 30 comprise notches 25, 35 in the first side 22, 32 of the grid 2", 3". In particular, the depth of the notches is in the range of 10% to 50% of the total height $h_1$, $h_2$ of the grid 2", 3". The deeper the notches are the more the mechanical stability is affected. The notches 25, 35 are configured for inserting the other grid. Even both grids 2", 3" may comprise notches 25, 35.

Figure 8:
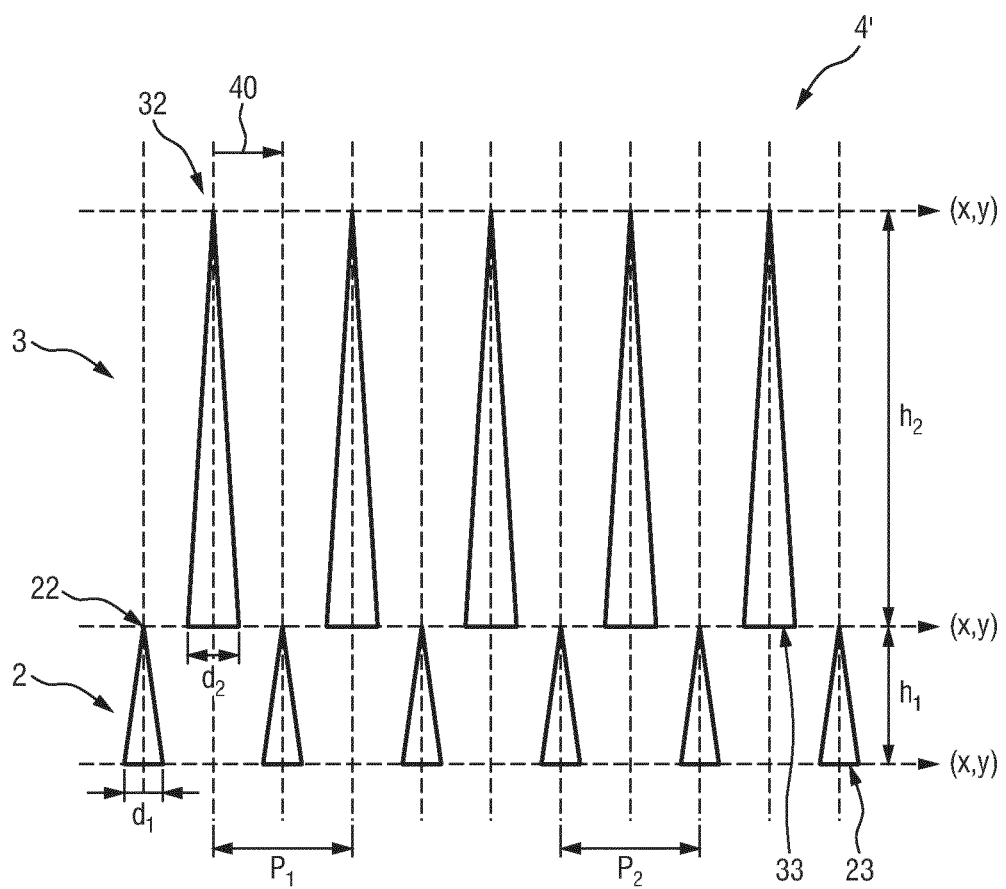
FIG. 8 shows a schematic view of a second embodiment an anti-scatter grid assembly.

FIG. 8 shows a second embodiment of a grid assembly 4'. The grid assembly 4' comprises a first grid 2 according to the embodiment illustrated in FIG. 2 and a second grid 3 according to the embodiment illustrated in FIG. 3. The first pitch $p_1$ and the second pitch $p_2$ are equal. The first grid 2 and the second grid 3 comprise a lateral shift (40) in each lateral direction (x, y). The lateral shift (40', 40") in each lateral direction (x, y) is equal to half of the first pitch $p_1$ and the second pitch $p_2$. The first thickness $d_1$ of the first lamellas 20 of the first grid 2 is smaller than the second thickness $d_2$ of the second lamellas 30 of the second grid 3. The first thickness $d_1$ and the second thickness $d_2$ have a conus-like shape comprising a gradient that increases the thickness of each lamella 20, 30 from the first side 22, 23 of each grid 2,3 to the second side 23, 33 of each grid 2, 3. In general, the shape of the lamellas may be different from a conus-like shape and may also increase from the first side 22, 32 to the second side 23, 33.

Figure 9:
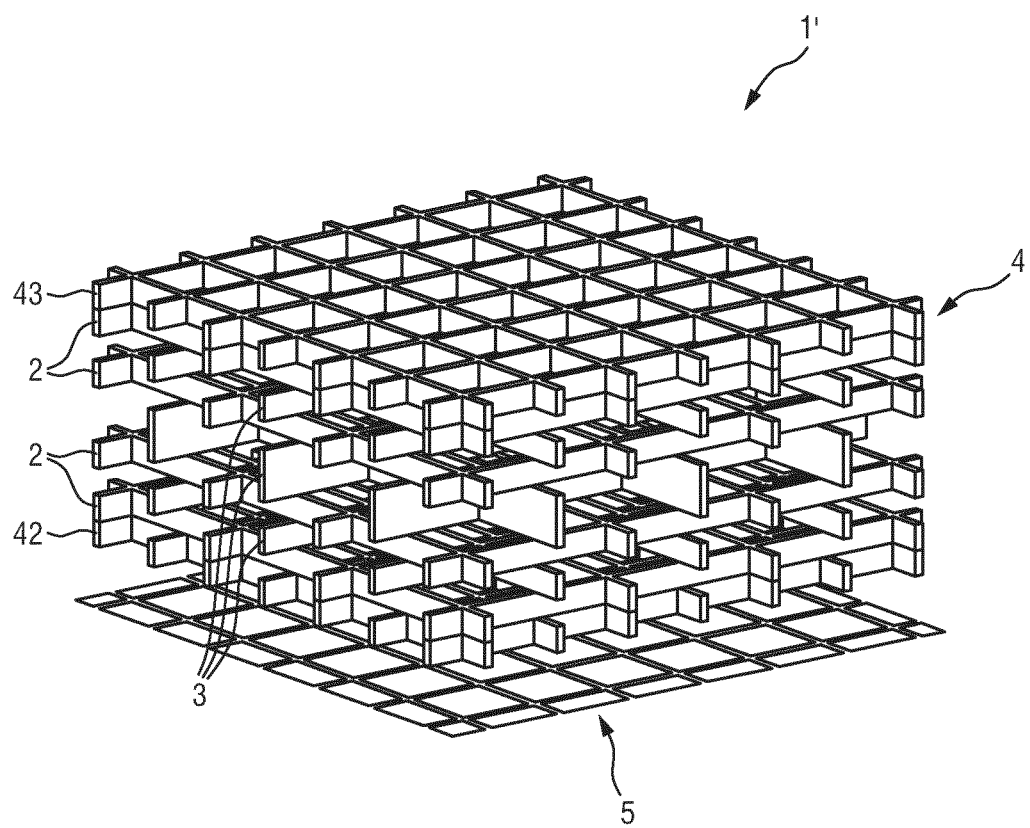
FIG. 9 shows a perspective view of a second embodiment of the detector arrangement.

FIG. 9 shows a second embodiment of a detector arrangement F. The detector arrangement 1' comprises a pixel detector 5 and an anti-scatter grid assembly 4. The anti-scatter grid assembly 4 comprises four first grids 2, three second grids 3, a third grid 42 and a fourth grid 43. The first grid 2 and the second grid 3 are alternately arranged on top of each other. The third grid comprises certain lamellas and third holes forming the third grid, wherein the third holes are equidistantly spaced apart and comprise a third pitch. The fourth grid comprises fourth lamellas and fourth holes forming the fourth grid, wherein the fourth holes are equidistantly spaced apart and comprise a fourth pitch. The third pitch and the fourth pitch are equal to the pixel pitch $p_3$. The first pitch $p_1$ of the first grid 2 and the second pitch $p_2$ of the second grid 3 are twice as large as the pixel pitch $p_3$ of the pixels 50 of the pixel detector 5. The third grid is arranged on the bottom of the first one of the first grids and the fourth grid is arranged on the top of the last one of the second grids.

In general, the thicknesses of each grid may be different and the height of each grid may be different. The anti-scatter grid assembly 4 is arranged on top of the pixel detector 5 with the third grid 42 facing the pixel detector 5. The third grid 42 covers the borders 51 of each pixel 50 of the pixel detector 5.

It should be noted that the figures are generally not to scale. Generally, the height dimension is much larger than the lateral dimension, i.e., the pixel size.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. An anti-scatter grid assembly for a pixel detector, comprising:
    a first grid comprising first lamellas and first holes; and
    a second grid comprising second lamellas and second holes, wherein the second grid is arranged incongruently on top of the first grid with a lateral shift in at least one lateral direction such that at least 50% of the second lamellas are substantially not aligned with the first lamellas, and wherein a first thickness of the first lamellas is smaller than a second thickness of the second lamellas.

2. The anti-scatter grid assembly according to claim 1, wherein the first thickness of the first lamellas is in the range of approximately 20% to 80% of the second thickness of the second lamellas.

3. The anti-scatter grid assembly according to claim 1, wherein the first thickness of the first lamellas and/or the second thickness of the second lamellas is constant.

4. The anti-scatter grid assembly according to claim 1, wherein the first thickness of the first lamellas and/or the second thickness of the second lamellas comprises a gradient changing the thickness from a first side to a second side of the grid.

5. The anti-scatter grid assembly according to claim 1, wherein a first height of the first grid is smaller than a second height of the second grid.

6. The anti-scatter grid assembly according to claim 5, wherein the first height of the first grid is less than 20% of the second height of the second grid.

7. The anti-scatter grid assembly according to claim 1, wherein the second grid is arranged to be movable in at least one lateral direction relative to the first grid providing a variable lateral shift in the range of approximately 0% to 10% of a pitch of the first holes and/or the second holes, and into a second position at a lateral shift in the range of approximately 40% to 60% of the pitch of the first holes and/or the second holes.

8. The anti-scatter grid assembly according to claim 1, wherein the first holes are equidistantly spaced apart in at least one lateral direction and comprise a first pitch and the second holes are equidistantly spaced apart in at least one lateral direction and comprise a second pitch, wherein the first pitch or the second pitch is an integer multiple of the other pitch.

9. The anti-scatter grid assembly according to claim 8, wherein the lateral shift is half as large as the first pitch and/or the second pitch.

10. The anti-scatter grid assembly according to claim 8, wherein a second height of the second grid is larger than the first pitch and/or the second pitch.

11. The anti-scatter grid assembly according to claim 10, wherein the second height of the second grid is in the range of 500% to 5000% of the first pitch and/or the second pitch.

12. The anti-scatter grid assembly according to claim 11, wherein the second height of the second grid is in the range of 1500% to 2500% of the first pitch and/or the second pitch.

13. The anti-scatter grid assembly according to claim 8, wherein the first pitch and the second pitch are equal.

14. The anti-scatter grid assembly according to claim 1, wherein the first grid and/or the second grid comprises contoured edges at a first side facing the other grid, wherein the contoured edges are configured for positioning of the other grid.

15. The anti-scatter grid assembly according to claim 1, wherein the first grid and/or the second grid comprises notches in a first side facing the other grid, and wherein the notches are configured for inserting the other grid.

16. The anti-scatter grid assembly according to claim 1, wherein the grid assembly comprises more than one first grid and/or more than one second grid, wherein the first grids and the second grids are alternately arranged on top of each other.

17. A detector arrangement, comprising:
a pixel detector; and
an anti-scatter grid assembly comprising:
   a first grid comprising first lamellas and first holes; and
   a second grid comprising second lamellas and second holes, wherein the second grid is arranged incongruently on top of the first grid with a lateral shift in at least one lateral direction such that at least 50% of the second lamellas are substantially not aligned with the first lamellas, and wherein a first thickness of the first lamellas is smaller than a second thickness of the second lamellas, wherein the anti-scatter grid assembly is arranged on top of the pixel detector such that the first grid faces the pixel detector.

18. The detector arrangement according to claim 17, wherein pixels of the pixel detector are equidistantly spaced apart in at least one lateral direction and comprise a pixel pitch, wherein the first pitch of the first grid and/or the second pitch of the second grid are an integer multiple of the pixel pitch of the pixels of the pixel detector.

19. The detector arrangement according to claim 17, wherein the first holes are configured to cover sets of pixels of the pixel detector, wherein the first lamellas cover the borders of each set of pixels of the pixel detector.

20. The detector arrangement according to claim 19, wherein the first holes are configured to cover sets of 2×2 pixels of the pixel detector.

* * * * *